United States Patent [19]

Fatur

[11] 4,075,443
[45] Feb. 21, 1978

[54] CUSHION SPRING SAFETY SYSTEM

[75] Inventor: Richard N. Fatur, Eastlake, Ohio

[73] Assignee: Towmotor Corporation, Mentor, Ohio

[21] Appl. No.: 713,467

[22] Filed: Aug. 11, 1976

[51] Int. Cl.² ............................................. B60K 28/00
[52] U.S. Cl. .................................. 200/85 A; 180/101
[58] Field of Search ............................... 180/101, 102; 200/61.58 R, 85 A, 85 R; 340/278

[56] References Cited

U.S. PATENT DOCUMENTS

| 2,708,005 | 5/1955 | Gazzo | 180/101 |
| 2,931,454 | 5/1960 | Schuster | 180/101 |
| 3,437,993 | 4/1969 | Recio et al. | 180/101 X |
| 3,500,946 | 3/1970 | Boyajian | 180/101 |
| 3,700,062 | 10/1972 | Garnett | 180/101 |
| 3,703,618 | 11/1972 | Lewis | 200/85 R |
| 3,704,352 | 11/1972 | Fontaine | 200/85 R |

FOREIGN PATENT DOCUMENTS 1,048,784  1/1959  Germany ........................... 200/85 R Primary Examiner—Kenneth H. Betts
Attorney, Agent, or Firm—Phillips, Moore, Weissenberger, Lempio & Majestic

[57] ABSTRACT

A system for disabling or neutralizing a vehicle when less than a predetermined force is exerted upon the spring assembly of the operator's seat of such vehicle. A contact plate is mounted directly upon the spring assembly interiorly of the padding and outer covering of the seat. A pressure responsive push-type switch is mounted upon a pair of torsion springs attached to the seat frame also interiorly of the padding and outer covering. At any time a given predetermined force is exerted upon the outer covering, padding and contact plate, the switch will be in contact with the contact plate and will permit the vehicle to operate. Whenever, through excessive operator bouncing or the like, such predetermined force is removed, contact between the plate and switch will be interrupted and the vehicle will be rendered inoperative.

6 Claims, 2 Drawing Figures

CUSHION SPRING SAFETY SYSTEM

BACKGROUND OF THE INVENTION

The invention relates to a safety system for vehicles utilized in rough or uneven terrain. More particularly, the invention relates to a safety switching mechanism which is mounted entirely within the confines of the operator's seat of a vehicle and which automatically renders the vehicle inoperative whenever the operator leaves the seat.

In vehicles such as earthmoving machines, lift trucks, and the like, which are often operated in rough or uneven terrain, a safety hazard exists in that the operators of such vehicles might be dislodged from their seats. The hazard is exaggerrated if, upon such dislodgement, the vehicle continues to operate. Safety belts and other devices designed to retain the operator within the seat are frequently not utilized because operator mobility is necessary. Accordingly, a system has been devised whereby the operator is permitted to leave his seat but when he does, whether by virtue of violent bouncing or intentionally, the vehicle will be rendered inoperative.

There have been attempts in the prior art to address the above-noted problems. Examples of such prior art inventions may be found in U.S. Pat. Nos. 2,931,454 to Schuster; 3,500,946 to Boyajjian; and 3,700,062 to Garnett. Such prior art inventions, however, do not disclose the compact, efficient, entirely seat-contained safety system presently disclosed.

SUMMARY AND OBJECTS OF THE INVENTION

The instant invention comprises a vehicle seat having a spring assembly and a frame. A contact plate is mounted for movement upon said spring assembly and a pressure responsive switch is mounted upon torsion springs attached to said frame. The exertion of a predetermined force upon said spring assembly will cause the contact plate to actuate the pressure switch and permit operation of the vehicle associated with the seat. Removal of said predetermined force will result in disengagement of said switch and immediate inoperability of said vehicle.

The principal object of the present invention is to provide a safety neutralizing system for a vehicle which system is contained completely within the confines of the operator's seat of such vehicle.

Another object of the present invention is to provide the above-noted system having a torsion spring-mounted, pressure-responsive switch actuated by the application of a predetermined amount of force to the operator's seat.

A further object of the present invention is to provide such a system including a contact plate attached to the spring assembly of the seat for engaging the switch when the noted force is applied.

Other objects and advantages of the present invention will become apparent from the following description and drawings.

DETAILED DESCRIPTION

Figure 1:
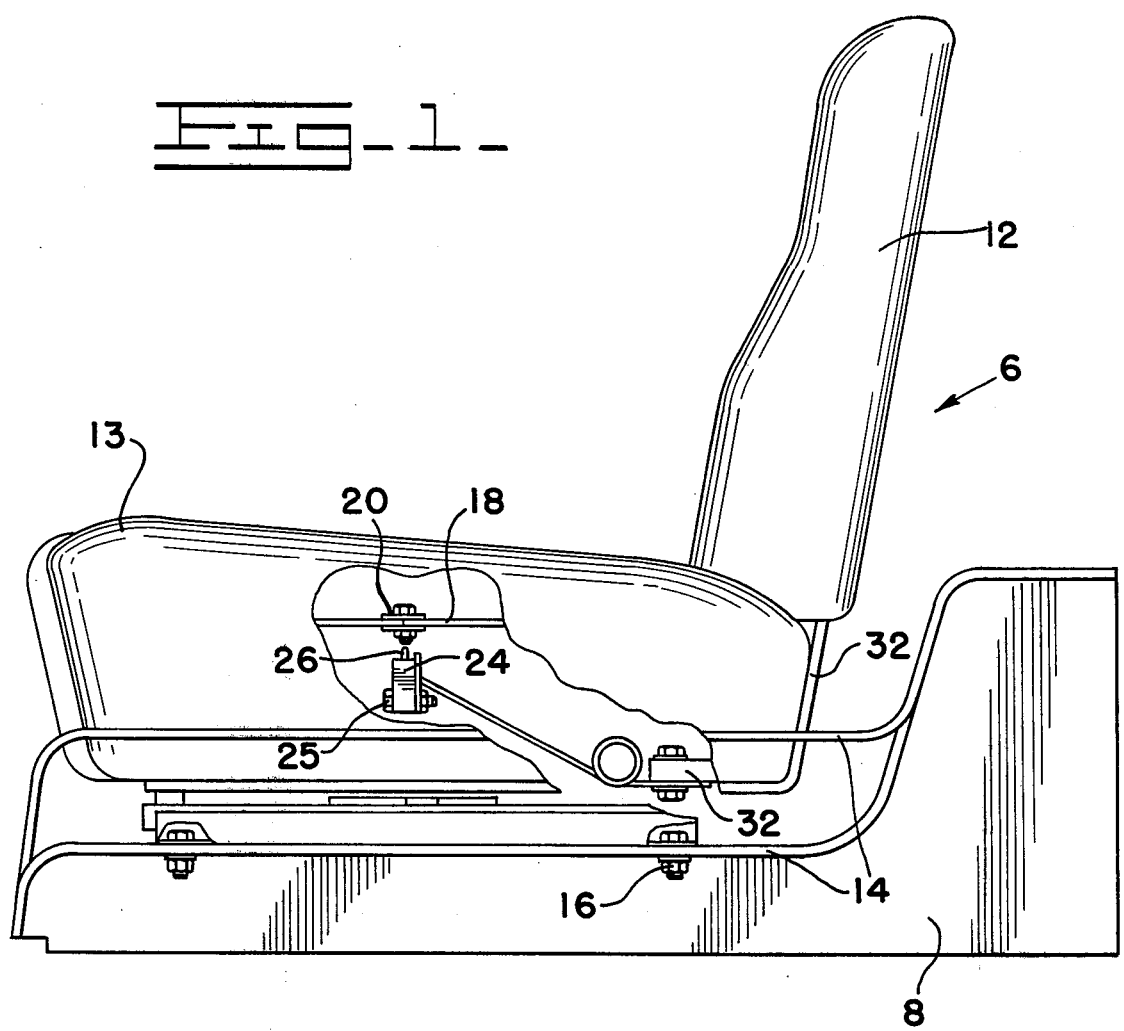
FIG. 1 is a cut-away side elevation of a vehicle seat embodying the principles of the present invention.

With reference to the drawings, the principles of the instant invention may be readily appreciated. An operator's seat is shown generally at 6 mounted upon a loading vehicle, a portion of which is shown at 8.

The seat includes a back support portion 12 and a bottom cushion portion. The seat construction consists of suitable frame members 32 over which is mounted the usual padding and outer covering material 13. The padding and covering material are supported upon a plurality of longitudinally extending sinusoidal springs, or the like, shown at 18 and 19. The frame of the seat is mounted upon the vehicle framework 14 by means of suitable fasteners such as bolts and nuts 16.

A contact plate 20, consisting essentially of a pair of flat plate members, is clamped directly to a pair of proximate springs 18 and 19 by means of bolts 22 or the like. The contact plate moves upwardly and downwardly with the springs 18 and 19 whenever a predetermined force is applied or removed from the outer covering of the bottom portion of the seat.

Figure 2:
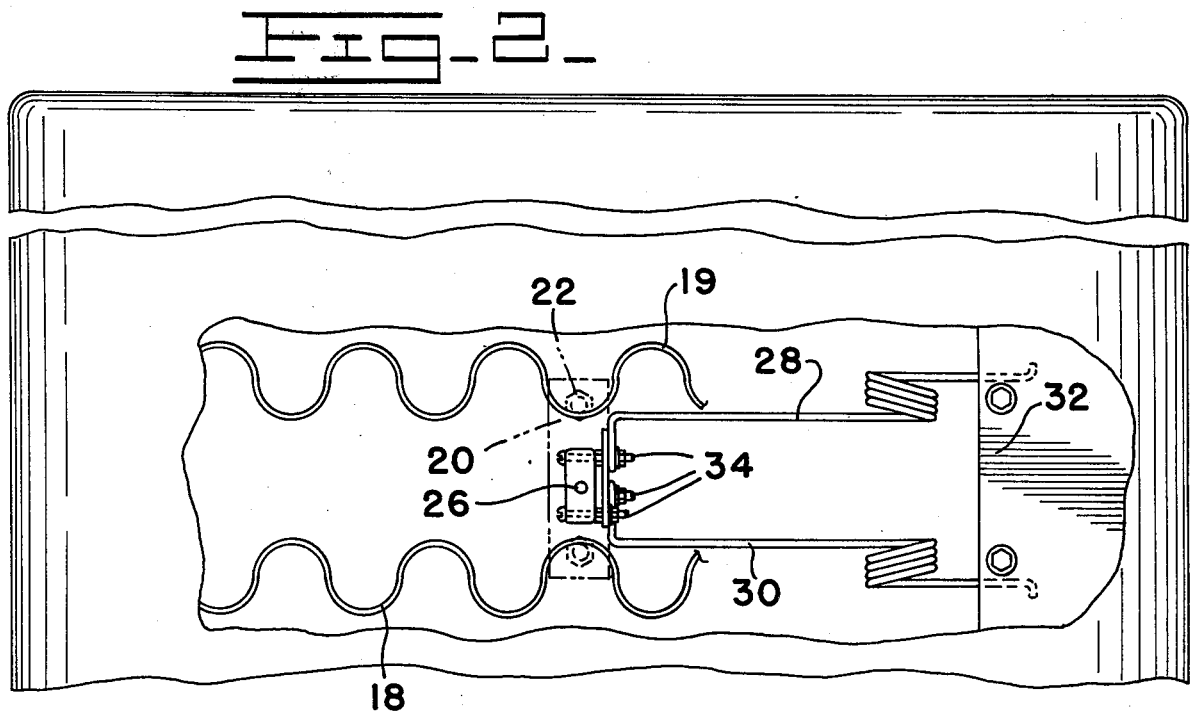
FIG. 2 is a partial cut-away plan view of the seat of FIG. 1.

Attached to a portion of the seat frame members 32 are a pair of torsion springs 28 and 30. The torsion springs extend, in parallel configuration, outwardly and obliquely upwardly (as shown in FIG. 1) to a position closely proximate the contact plate 20. The extended ends of such torsion springs are formed into loops and bent inwardly toward one another, as clearly shown in FIG. 2. A conventional pressure responsive push-activated, spring-released switching device 24 is attached to the looped ends of the torsion springs 28, 30 by suitable fastening means 25. The switch includes a push button 26 and suitable electrical leads 34 for connection of the switch to a vehicle system readily neutralizable upon the cessation of power thereto such as the ignition system or vehicle transmission.

In operation, the system components are selected and arranged so that upon the application of a given predetermined force to the seat bottom portion, say 40 pounds, the springs 18 and 19 will flex downwardly (as shown in FIG. 1) and the contact plate 20 will engage the push button 26 to permit the vehicle to operate in normal fashion. The switch, being mounted upon the springs 28, 30 will move up and down with the contact plate and will remain engaged therewith as the operator bounces with movements of the vehicles so long as the bounces do not become violent enough to decrease the operator's force application to the seat to less than 40 pounds. If the latter condition did obtain, the contact plate 20 and switch button 26 would separate and the vehicle would be instantly rendered inoperative.

It should be understood that the above-described invention comprehends many variations and modifications not precisely delineated and that the invention includes all such variations and modifications as are embraced by the scope of the appended claims.

What is claimed is:

1. In a vehicle, a seat having seat frame members, and seat covering material mounted upon said frame members, a vehicle safety system including: spring means mounted upon said frame members for supporting said covering material, pressure activated switch means for rendering said vehicle capable of operation when activated and incapable of operation when deactivated, at least one torsion spring having a free end and a fixed end, said fixed end being mounted upon said seat frame members, said switch means being mounted on said free end so that said at least one torsion spring is located interiorly of said covering material and of the confines of said seat, contact means mounted upon said spring means for engaging said switch means to activated said switch means upon the application of a predetermined force to said covering material and for disengaging said switch means to deactivate said switch means upon the cessation of application of said predetermined force, said contact means including a pair of flat plate members and means attaching said flat plate members to said spring means.

2. The invention of claim 1 wherein said spring means include at least a pair of flat wound sinusoidal spring members.

3. The invention of claim 1 wherein said at least one torsion spring extends from its fixed end, outwardly and obliquely upwardly towards said spring means so that its free end is positioned closely proximate to said contact means.

4. The invention of claim 3 wherein said at least one torsion spring comprises a pair of torsion springs extending in substantially parallel configuration.

5. The invention of claim 4 wherein the fixed ends of said torsion springs are formed into loops.

6. The invention of claim 5 wherein said switch means comprises a switch, and fastening means attaching said switch to the free ends of said torsion springs.

* * * * *

UNITED STATES PATENT OFFICE
CERTIFICATE OF CORRECTION

Patent No. 4,075,443      Dated February 21, 1978

Inventor(s) Richard N. Fatur

It is certified that error appears in the above-identified patent and that said Letters Patent are hereby corrected as shown below:

Column 3, line 4, "activated" should be --activate--

Signed and Sealed this

Eighth Day of August 1978

[SEAL]

Attest:

RUTH C. MASON  
*Attesting Officer*

DONALD W. BANNER  
*Commissioner of Patents and Trademarks*